March 10, 1970 W. C. BECKWITH 3,499,561
SLAG POT CARRYING VEHICLE
Filed Sept. 18, 1968 7 Sheets-Sheet 3

INVENTOR.
Walter C. Beckwith
BY
Joseph P. Gastel
ATTORNEY.

United States Patent Office 3,499,561
Patented Mar. 10, 1970

3,499,561
SLAG POT CARRYING VEHICLE
Walter C. Beckwith, Angola, N.Y., assignor to Clarence A. Hackett, Inc., Tonawanda, N.Y., a corporation of New York
Continuation-in-part of application Ser. No. 703,610, Feb. 7, 1968. This application Sept. 18, 1968, Ser. No. 766,667
Int. Cl. B65j 1/02; B60p 1/14, 1/48
U.S. Cl. 214—313                                21 Claims

ABSTRACT OF THE DISCLOSURE

A slag pot carrying vehicle for lifting a slag pot and its contents from the ground, transporting it to a dumping site, tipping the pot to dump the slag contents, and thereafter returning the pot to a furnace area and setting it down in an upright position on the ground, comprising a vehicle having a frame, a carriage on said frame, motor means for moving the carriage from a rearmost pot lifting position on the trailer to a central transit position forwardly of the rear wheels and for moving said carriage to a pot dumping position at the rear of the vehicle, spaced arms pivotally mounted on the carriage, pivot means for pivoting the spaced arms from a pot lifting position to a pot holding position on the carriage, means for locking the slag pot to the arms for dumping, said pivot means causing said arms to pivot rearwardly with the pot locked thereto for effecting dumping of the pot, said pivot means thereafter returning said pot to an upright position and causing said arms to pivot rearwardly after said locking means release said pot to set said pot down in an upright position. The mounting between the arms and the carriage are off-center as to permit the pot to tilt rearwardly by its own unbalance, both during dumping and when the pot is being set down in an upright position.

CROSS REFERENCE TO RELATED APPLICATION

The present application is a continuation-in-part of application Ser. No. 703,610, filed Feb. 7, 1968 now abandoned.

BACKGROUND OF THE INVENTION

The present invention relates to an improved vehicle of the type which is used to transport a slag pot.

In Patent No. 3,266,648 a slag pot carrying vehicle is disclosed which carries the slag pot on a trailer frame forwardly of rear wheels mounting pneumatic tires, to minimize the loading on such tires when the vehicle is in transit, thereby improving the maneuverability of the vehicle as well as preserving the roadways on which the vehicle must travel. For dumping, the pot is moved to a rearmost portion of the vehicle, and suitable mechanism causes the pot to tilt rearwardly of said rear wheels to effect said dumping. Thereafter, the pot is returned to an upright position and is moved forwardly of the rear wheels for transportation back to a furnace area.

The foregoing vehicle required the services of a crane for mounting and demounting the slag pot on the vehicle. This was highly inconvenient because it required a close synchronization between the vehicle and the crane. More specifically, many times a vehicle was elsewhere when the crane had a slag pot which it had to dispose of. In a situation of this type, the crane was tied up while awaiting arrival of the vehicle, and therefore could not be used elsewhere in the steel mill. Other times a vehicle would return with an empty slag pot but could not have it unloaded until the crane was free to perform this task. In short, in a situation where close synchronization could not be effected, there was an excessive amount of lost time which proved to be costly.

Other types of slag pot hauling vehicles, in order to overcome the foregoing losses due to lack of synchronization, were able to mount and demount a slag pot by the use of equipment mounted on the vehicle itself. However, such vehicles, because of their inherent structural nature, were limited to use with smaller slag pots, especially since they supported the slag pot in a position relatively close to the rear wheels of the vehicle, which had to absorb all of the loading. In addition, because of the mechanical construction of such vehicles, they required extremely complex and expensive hydraulic pot lifting structure which inherently limited the size of the pot which could be carried. It is with an improved slag pot carrying vehicle which overcomes all of the foregoing shortcomings while retaining all of the advantages of the above described type of vehicle disclosed in Patent No. 3,266,648 that the present invention is concerned.

SUMMARY OF THE INVENTION

It is accordingly one object of the present invention to provide an improved slag pot carrying vehicle which can lift a pot of slag from the ground onto the rear of the vehicle frame, move said pot to a central position forwardly of the rear wheels to relieve the loading on the rear tires in transit, move said pot to a rearmost position over the rear wheels to dump said slag from said pot, return said pot to an upright position on the vehicle after dumping, and thereafter demount the pot from said frame, all by the use of highly simple and relatively inexpensive structure mounted on the vehicle itself. A related object of the present invention is to provide an improved self-loading and self-unloading slag pot carrying vehicle of the foregoing type which is capable of carrying a relatively large slag pot and its contents which constitute a massive load of as much as 100 tons by virtue of the fact that the slag pot is carried on a portion of the vehicle forwardly of the rear wheels whereby the load is distributed between the rear wheels and front wheels of the vehicle. A further related object of the present invention is to provide an improved slag pot carrying vehicle wherein the dumping of the slag and the demounting of the pot from the vehicle is effected by unbalance achieved by the location of the pot and the manner in which it is mounted, whereby the necessity for highly complex structure to achieve this function is obviated.

A further object of the present invention is to provide an improved slag pot carrying vehicle which can be fabricated by modifying existing slag pot vehicles thereby increasing or preserving the utility of such existing vehicles, which constitutes a great economic benefit considering the initial high cost of such vehicles. Other objects and attendant advantages of the present invention will readily be perceived hereafter.

The improved slag pot carrying vehicle of the present invention is capable of lifting a massive load consisting of a slag pot and its contents from the ground onto the vehicle, moving said load to a position forwardly of the rear wheels whereby the load of the pot is distributed between the front and rear wheels of the vehicle, thereby improving the maneuverability of the vehicle in transit as well as reducing the loading on the rear axle, tilting the pot at a dumping area to discharge its contents, and thereafter unloading the slag pot onto the ground in an upright position. The improved slag pot carrying vehicle comprises a frame having a front portion and a rear portion, rear wheels mounting pneumatic tires on the frame proximate the rear portion, a carriage, arm means on the carriage, mounting means pivotally mounting the arm means on the carriage for pivotal movement about an axis extending in a direction transverse to the longitudinal axis of the frame, track means on the frame, motor means for driving the carriage between a first position and a second position on the track means, said first position being remote from the rear portion of the frame and being located to one side of the rear wheels between the rear and front portions of the frame and the second position being closer to the rear portion of the frame and substantially overlying the rear wheels, whereby the slag pot and its contents exert less of the load on the pneumatic tires on the rear wheels when the carriage is in the first position than when the carriage is in the second position, pivoting means coupled to the arm means for effecting pivotal movement of said arm means fore and aft relative to the rear portion of the frame when the carriage is in the second position, and means for selectively locking the pot to the arm means for effecting dumping of the contents thereof by causing tilting of the pot when the arms tilt rearwardly and the pot is locked thereto, said locking means permitting said pot to remain in an upright position for loading and unloading on the vehicle by rotating relative to said arm means when said locking means do not lock said pot to said arms. The arm means are mounted on the carriage in such a manner that the pot will either tilt rearwardly or move rearwardly in an upright position, by its own unbalance, thereby obviating the necessity for relatively complex and expensive hydraulic or mechanical structure for emptying and unloading the pot. In addition, because of the mechanical orientation of parts, a simple reel can be used for loading a pot of slag onto the vehicle, thereby again obviating the necessity for complex hydraulic or mechanical structure for this purpose. The present invention will be more fully understood when the following portions of the specification are read in conjunction with the accompanying drawings wherein:

DESCRIPTION OF THE PREFERRED EMBODIMENTS

The pot carrying vehicle 10 includes a tractor 11 which is pivotally connected to a pot trailer 12 by means of a suitable pivotal connection 13 which is conventional in the art. It is to be noted at this point that while a specified type of tractor-trailer combination has been disclosed, the present invention may be practiced with any type of vehicle which is suitable.

In accordance with the general intended usage of the pot carrying vehicle of the present invention, pot 14 containing slag is loaded onto pot trailer 12 at a loading area and is hauled by vehicle 10 to a dumping area which is a considerable distance away. Pot 14 with its load of slag may weigh as much as 100 tons. In order to minimize injuries to the road by the weight of the vehicle and its loads, tractor 11 is supplied with dual wheels mounting pneumatic tires 15 and pot trailer 12 has quadruple tandem wheels mounting rubber pneumatic tires 16. The tire size may be approximately 1400 x 25. As can be seen from FIGURES 1 and 2, the front and rear tires 16 of each rear set are mounted on suitable axle constructions (not numbered) which include levers 17 having the central portions thereof pivotally mounted on axle 17' secured between depending portions 18 of the frame of the vehicle, the front and rear wheels being mounted on opposite ends of said levers. Any other suitable type of axle construction may be used. Axle 17' (FIGURE 6) extends between the rearwardly extending sides 19–19' of the trailer frame 20, said sides being connected to each other at their forward end by cross member 21.

Figure 1:
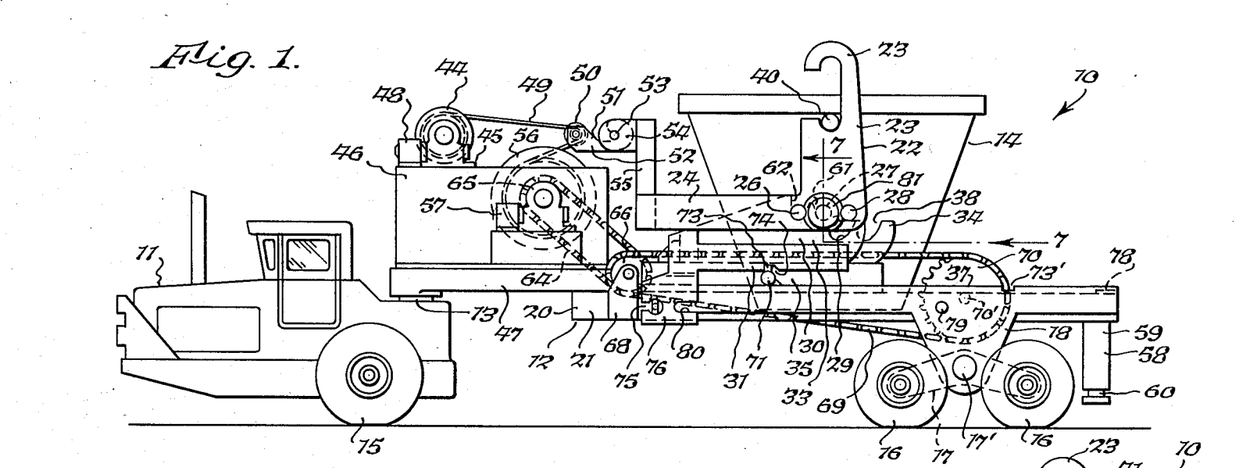
FIGURE 1 is a side elevational view of the pot carrying vehicle of the present invention with the pot shown in the position which it occupies in transit.
Figure 2:
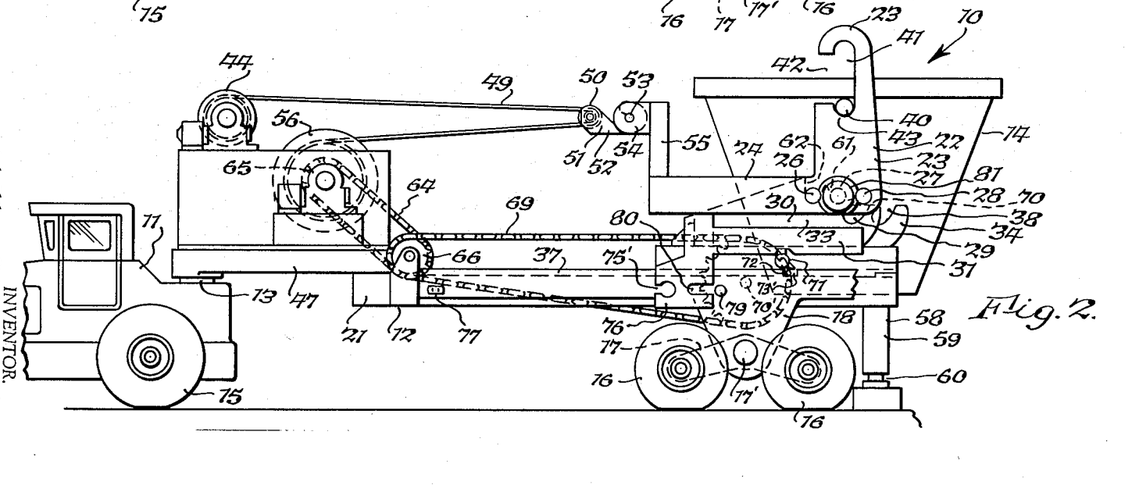
FIGURE 2 is a side elevational view similar to FIGURE 1 but showing the slag pot moved to a position substantially above the rear wheels of the trailer prior to dumping.

Slag pot 14 occupies a central position on pot trailer 12 when the vehicle is in transit, as can be seen from FIGURE 1. In this position the weight of the pot 14 and its contents tends to be distributed between the front and rear tires 15 and 16 in a more equal manner than if the pot 14 occupied a position at the extreme rear end of the pot trailer 12, such as shown in FIGURE 2. By virtue of the fact that the weight is distributed in the foregoing manner while the pot carrying vehicle 10 is in transit to its dumping location, the rear tires are not subjected to a loading which is in excess to their capacity, and further by virtue of the fact that the front tires 15 carry a good portion of the load, their traction with the ground is enhanced.

Figures 3, 4, 5:
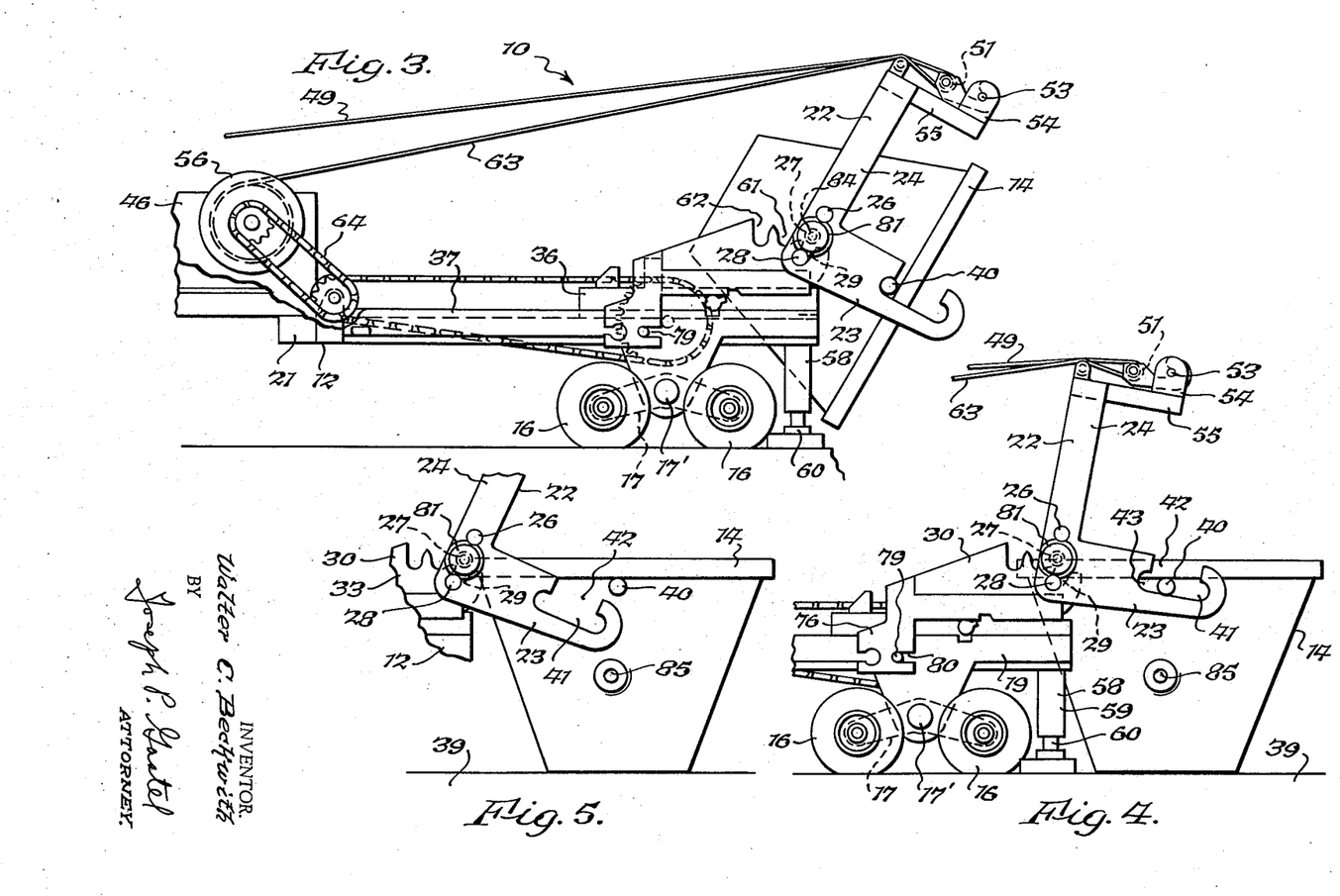
FIGURE 3 is a fragmentary side elevational view similar to FIGURE 2 but showing the slag pot being dumped.
FIGURE 4 is a fragmentary side elevational view showing the position which the pot lifting arms assume during the lifting of the pot from the ground and setting it onto the ground.
FIGURE 5 is a fragmentary side elevational view showing the position which the lifting arms assume either prior to engaging the pot for lifting or immediately after losing contact with the pot after setting it down.

As noted above, the advantages of the instant vehicle is that it can lift a slag pot and its contents from the ground onto the vehicle and return the pot to an upright position on the ground, after having dumped its contents. In order to lift the pot 14 from its position on the ground, as shown in FIGURE 5, onto its rear position on the trailer, as shown in FIGURE 2, a lifting arm frame 22 is provided (FIGS. 1–6, 12 and 13). Frame 22 includes a pair of spaced arms 23 extending upwardly from rearwardly extending frame members 24 which are secured to each other at their forward ends by cross member 25. Arms 24' are affixed at their forward end to cross bar 25, and extend in a substantially parallel relationship to members 24. Pins 26, 27 and 28 extend between each pair of elongated frame members 24–24', as can best be seen from FIGURE 12.

Figures 8, 9, 10, 11, 12, 13, 14:
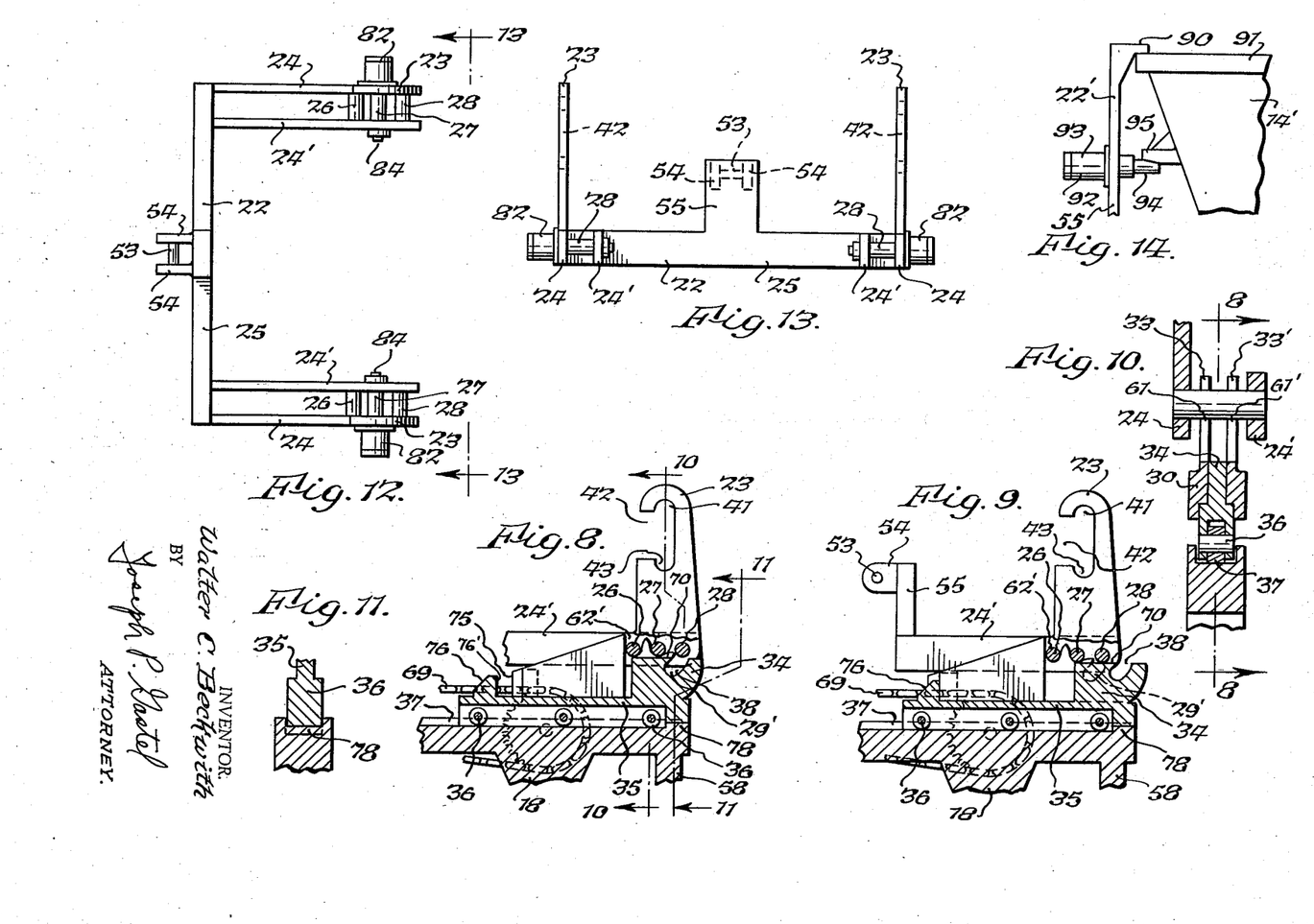
FIGURE 8 is a view partially in cross section taken substantially along line 8—8 of FIGURE 10 and showing the positions assumed by the carriage and carrier during dumping.
FIGURE 9 is a view similar to FIGURE 8 but with the carrier having moved relative to the carriage to hold the pot lifting arms in an upright position prior to moving the pot back to a central position on the trailer.
FIGURE 10 is a view taken substantially along line 10—10 of FIGURE 8 and showing the relationship between the track on the trailer, the carriage, the carrier and the lifting arms.
FIGURE 11 is a cross sectional view taken substantially along line 11—11 of FIGURE 8 and showing the relationship between the end of the carriage and the end of the track.
FIGURE 12 is a plan view of the lifting arm frame.
FIGURE 13 is an end elevational view of the lifting arm frame taken substantially in the direction of the arrows 13—13 of FIGURE 12.
FIGURE 14 is a fragmentary side elevational view showing an alternate arrangement for locking the pot to the lifting arm frame to effect tilting thereof.

In order to lift a pot such as 14 from the ground onto the vehicle, the lifting arm frame 22 is caused to assume a position such as shown in FIGURES 4 and 5, mainly FIGURE 5, in a manner to be described more fully hereafter. In this position each of pins 28 on opposite sides of the frame 22 is received in slots 29–29' (FIGS. 3–5 and 8–9) in side plates 33–33', respectively, forming each of two rearwardly extending sides 30 of carriage 31 which are connected by cross bar 32. More specifically, slot 29 is located in each plate 33 mounted on the outside of each side 30 (FIGS. 2 and 10) and slot 29' is located in each of plates 33' mounted on the inside of each of sides 30 (FIGS. 8 and 10). As can be seen from FIGURES 5 and 8, slots 29 and 29' are in alignment to receive pin 28.

Each pair of plates 33–33' straddles a cam plate 34 (FIGS. 8–10) which is rigidly affixed to one of a pair of spaced carrier arms 35 mounting rollers 36 which cause each of said carrier arms to roll on tracks 37 located on the top of sides 19–19' of the trailer frame. Carriage sides 30 are movable relative to cam plates 34, as will become more apparent hereafter. In one position of carriage sides 30, slot 38 of each cam plate 34 is in alignment with slots 29–29' in the carriage sides 30. Because of this relationship, pins 28 of the lifting arm frame 22 can be received in aligned slots 29–38–29' so that the lifting arm frame 22 can assume the position shown in FIGURES 3, 4 and 5.

With the arms 23 of the lifting arm frame in the position shown in FIGURE 5, the trailer 12 is backed up so that arms 23 straddle a pot 14 containing slag, said pot resting on ground 39. Pot 14 has pins 40 extending from diametrically opposite sides thereof along the vertical center axis of the pot. Arms 23 have a slot 41 therein with a cutaway portion 42 leading to said slot. This essentially is a hook arrangement. After the trailer is backed rearwardly so that portions 42 lie under pins 40, frame 22 is pivoted in a counterclockwise direction in FIGURES 4 and 5 about pins 28 so as to cause pot pins 40 to pass through cutaway portions 42 and enter slots 41. Thereafter, frame 22 is caused to continue its pivotal motion about pins 28 in a counterclockwise direction. In so doing, pins 40 will move into ends 43 of slot 41 after arms 23 move through the horizontal and at this time pot 14 will be lifted off of the ground 39 but will still remain in an upright position because pins 40 can rotate or pivot relative to cutaway portions 43 while arms 23 are caused to pivot. Portions 43 are therefore support means for pivotally supporting the pot.

Figures 6, 7:
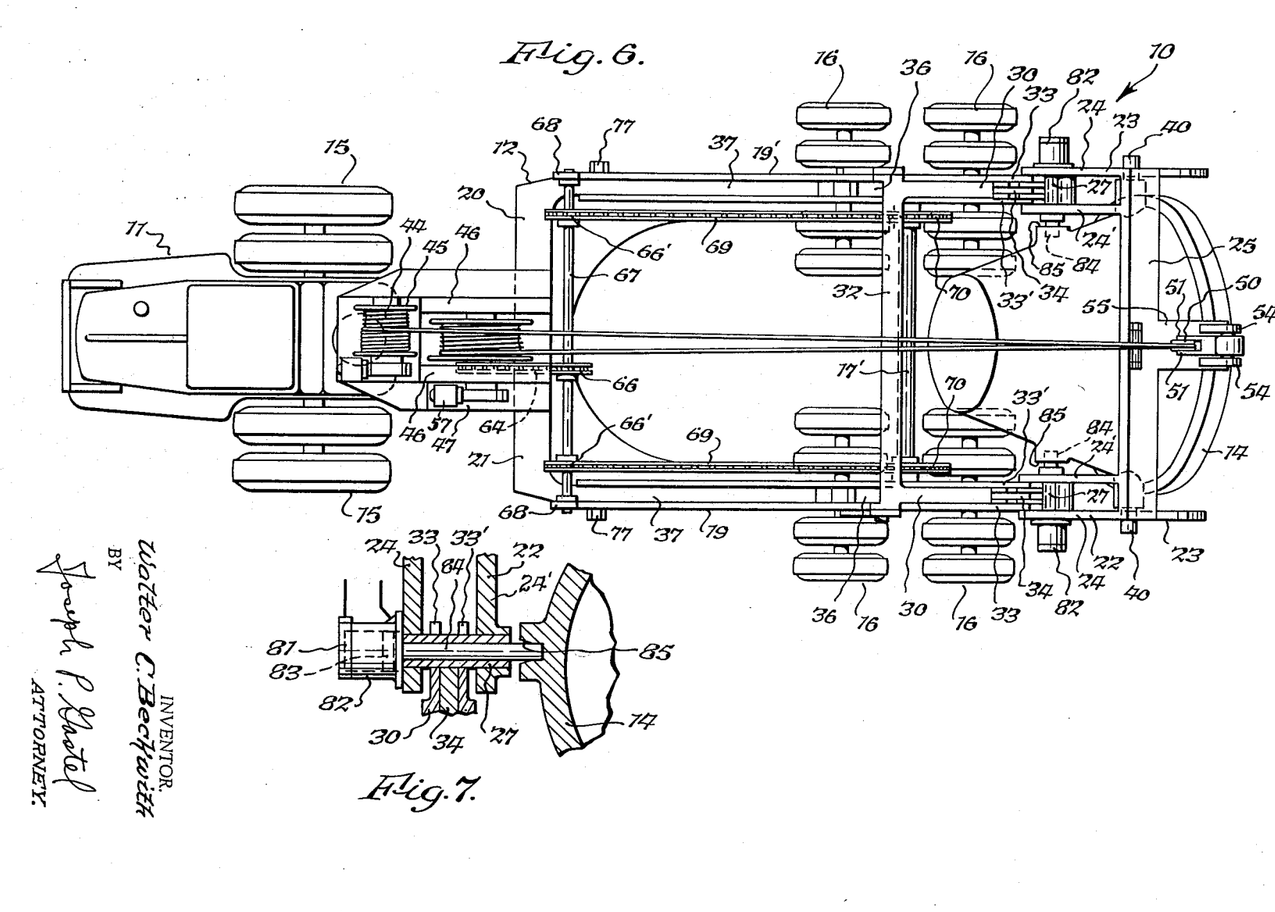
FIGURE 6 is a plan view showing the various components of the vehicle and the pot in dumping position.
FIGURE 7 is a fragmentary cross sectional view taken substantially along line 7—7 of FIGURE 1 and showing an arrangement for locking the pot to the lifting arms so as to cause it to tilt rearwardly with the lifting arms for dumping, as shown in FIGURE 3.

The pivoting of frame 22 is effected by a drum or reel 44 mounted on platform 45 (FIG. 6) extending between side plates 46 extending upwardly from base 47 secured to cross frame member 20 (FIGURES 1 and 6). Reel 44 is driven by motor 48 which is also mounted on platform 45. A cable 49, which has one end attached to reel 44, encircles pulley 50 mounted between arms 51 of hook 52 which engages pin 53 (FIGS. 1, 12 and 13) mounted between ears 54 extending from strut 55 mounted centrally on cross member 25 of lifting arm frame 22. The other end of cable 49 is secured to reel or drum 56 mounted between side plates 46 and operatively connected to a driving motor 57. When reel 56 is held stationary and reel 44 is rotated in a counterclockwise direction in FIGURE 1, the upper run of cable 49 will move to the left in FIGURE 1 and thus cause frame 22 to pivot in a conterclockwise direction in FIGURE 3 about pins 28 on opposite sides thereof (FIG. 4).

At this time it is to be noted from FIGURE 4 that an hydraulic piston and cylinder arrangement 58 consisting of cylinder 59 and piston 60 extends downwardly from each side 19 and 19' of the trailer frame. The purpose of this is to cause the lower end of piston 60 to engage the ground in the nature of a hydraulic jack to prevent tipping of the vehicle about the rear wheels during lifting and dumping of the slag pot 14. The conduits for actuating hydraulic motor 58 and the suitable controls are not shown but it will be appreciated that suitable valving is provided as well as a suitable source of hydraulic fluid. The jack remains in engagement with the ground only so long as slag pot 14 is at the rear of the vehicle and after it is moved to the position shown in FIGURE 1, piston 60 is retracted so that the tires 16 will carry the entire load. Prior to dumping pot 14 piston 60 is again caused to engage the ground prior to movement of pot 14 into a position above the rear wheels.

Pivotal movement of arms 23 will continue in a counterclockwise direction about pins 28 until such time as pins 27, which are adjacent to pins 28, move into slots 61–61' (FIGS. 3 and 10) in each of carriage sides 30. As can be seen from FIGURE 1, when pot 14 is in a vertical position, pin 40 is located between vertical lines extending through the axes of pins 27 and 28. Furthermore, pins 27 will come to rest in slots 61–61' before pins 40 pass over the centers of pins 28. Thus, the weight of the pot is always to the rear of the pin about which lifting arm frame 22 is pivoting so that frame 22 will ease into a position wherein its portions 24 are horizontal, but will not fall into such position with a jolt. When portions 24 reach a horizontal position, such as shown in FIGURE 2, pins 26 on the opposite sides of frame 22 will rest in slots 62–62' (FIGS. 1 and 8) in plates 33–33'. At this time, pins 26 and 27 will be resting in the slots 61–61' and 62–62', respectively, of the carriage sides 30. The slots in which pins 27 and 28 rest acts as journals.

The next step in mounting pot 14 onto trailer 12 is to move it from the position at the end of the trailer to a position shown in FIGURE 1. To this end, reel 56 is energized by motor 57 to cause the lower run 63 of cable 49 to move to the left. Carriage 31 moves to the left as a result of a chain drive which includes a chain 64 (FIG. 1) encircling pinion 65 mounted coaxially with the reel 56 and pinion 66 keyed to shaft 67 (FIGS. 1 and 6) having its opposite ends journalled in ears 68 on frame sides 19 and 19'. Sprockets 66' are also spacedly keyed to shaft 67 (FIG. 6) and are each encircled by a chain 69 which also encircles sprockets 70 mounted on stub shafts 70' at the rear of the vehicle. The upper run of each chain 69 is rigidly secured to cross member 32 of the carriage so as to cause the cross member to move to the left on sides 19–19' of the trailer, as the upper run of chain 69 is driven to the left.

During the initial movement of chains 69, the carriage sides 30 will move from a position, such as shown in FIGURE 8, wherein slots 29–38–29' of the carriage arms and the carrier were in alignment to a position such as shown in FIGURE 9, wherein slot 38 is no longer in alignment with slots 29–29' because carriage 31 moves to the left while cam 34 remains stationary. so that surfaces 70 (FIG. 9) of the cams 34 are located under pins 28, as shown in FIGURES 2 and 9. Movement to the left of arm 35 which is integral with cam 34 is prevented during rearward movement of carrier sides 30 because pivotable dog 71 (FIGS. 1 and 2) has its tooth 72 held in slot 73' of the frame to prevent movement of arm 35 while carriage sides 30 slide forwardly. This movement will continue until upper dog 73 moves into slot 74 in carriage sides 30, thereby locking the carriage sides to carriers 35 and causing both to move in unison to the left with chains 69. This movement in unison is realized by virtue of the fact that ends 75 (FIG. 8) of carriage sides 30 abut stop 76' and cause the carriage 31 and the carriers 35 to move in unison toward reel 56. The foregoing movement continues until each slot 75' of each ear 76 receives each key 77 extending outwardly from each of frame sides 19–19', and thereafter these pins are rotated to lock the carriage in the position shown in FIGURE 1.

After the pot 14 has been moved to the position shown in FIGURE 1, the vehicle is driven to a suitable dumping area for the purpose of dumping the contents of the pot. At the dumping area and before the pot is moved from the position shown in FIG. 1 to the rear of the trailer, the hydraulic piston and cylinder 59–60 is actuated to cause piston 60 to engage the ground and thus take a part of the load off of the rear tires 16. Thus, when the pot 14 is subsequently moved to a position above the rear wheels, as shown in FIGURE 2, the tires are not loaded excessively and furthermore there is additional support at the end of the trailer frame to prevent it from pivoting under the weight of the slag pot and its contents.

Thereafter, to unlock carriage 31, key 77 is turned so that ears 76 can move to the right. Because of the connection between reel 56 and pot carriage 31 provided by chains 64 and 69, the pot 14 is moved from the position of FIGURE 1 to the position of FIGURE 2. The diameter of reel 56 is twice the diameter of pinion 66 so that for every unit of linear movement of chain 69 to the right there will be a double length of cable 49 uncoiled, so as to maintain this cable taut. Pot 14 on carriage 30 will move to the right until such time as carrier 36 (FIG. 11) rides up on step 78 (FIGS. 9 and 11) to take the weight off of roller 36 adjacent thereto and the movement of carrier arms 35 will then stop when they engage suitable stops, not shown. Continued movement of chains 69 will cause the carriage sides 30 to continue to move after carrier arms 35 have stopped until such time as pins 79 extending outwardly from opposite sides 19 and 19' of the frame are seated in slots 80 of ears 76 depending downwardly from the carriage sides 30. At this time carriage sides 30 will have moved to the right relative to carrier arms 35 so as to cause slots 29–38–29' in the carrier sides and in cams 34 to be in alignment so that pins 28 of the arm carrying frame 22 can move into these slots. In other words, before there was relative movement of carriage sides 30 relative to cam 34, they occupied the relative positions shown in FIGURES 2 and 9. After such movement they occupy the relative positions shown in FIGURE 8.

After the pot 14 has reached an upright position wherein pins 28 of the frame 22 can move into aligned slots 29–38–29', the pot 14 is ready for movement into the position shown in FIGURE 3 for dumping. However, as noted above, pins 40 on opposite sides of the pot can pivot relative to ends of slot 43 in arms 23 of the pot carrying frame 22, unless they are otherwise restrained. Therefore, to lock the pot 14 relative to lifting arm frame 22, a hydraulic pin-locking arrangement 81 is provided, as shown best in FIGURE 7. This arrangement 81 includes a cylinder 82 mounted on each of members 24 and a piston 83 is located in each cylinder 81 and is connected to a pin 84 which rides axially within each central pin 27 extending between spaced parallel members 24 and a piston 83 is located in each cylinder concavities 85 on diametrically opposite sides thereof for receiving the ends of pins 84. When pins 84 are moved into depressions 85 as a result of the admission of hydraulic fluid into cylinder 82 in the proper direction from a source of hydraulic fluid, not shown, pot 14 will be locked to arms 23 at spaced points, namely, where pins 40 rest in the ends of slots 41 and where pins 84 are received in depressions 85.

After pot 14 has been locked to arms 23 in the above described manner, it is merely necessary to rotate drum 44 in a clockwise direction to cause the upper run of cable 49 to move to the right. Pot 14 will tilt rearwardly to the position shown in FIGURE 3, by pivoting about pins 27 and 28 of frame 22 because of the pot's own unbalance. In this respect it is to be noted from FIGURE 2 that the centerline of pot pins 40 is to the right of the centerline of pins 27, and between pins 27 and 28. Therefore, since pins 28 are no longer supported by cam surface 70 of cam 34, pins 28 can drop into aligned slots 29–38–29' and therefore pivotal movement will occur about pins 27 until such time as pins 28 reach the bottoms of slots 29–38–29'. At this time the center of gravity of pot 14 will have moved over the center of pins 28 and thus pot 14 can continue moving pivotally in a clockwise direction to the position shown in FIGURE 3 by its own unbalance. This movement can continue until pot 14 has reached any desired attitude, as the movement rearwardly is controlled by the playing out of cable 49. If bumping of the pot is desired, in the event that the slag has hardened within the pot, drum 44 is stopped and rapidly reversed to create a bumping effect for jarring any hardened slag loose from pot 14. After dumping of pot 14 has been completed, drum 44 is rotated in a counterclockwise direction in FIGURE 1 to cause the pot 14 to return to an upright position similar to that shown in FIGURE 2, as described above relative to the lifting of the pot from the ground. In this respect, the upper run of cable 49 is moved to the left until such time as pins 26, 27 and 28 of the frame 22 assume a horizontal position such as shown in FIGURE 2 and thereafter drum 56 is rotated in a counterclockwise direction to move carriage 30 to the left relative to carrier arms 35 until such time as cam surface 70 of cam 34 underlies pin 28 to prevent rearward pivotal movement of pot 14. Thereafter continued rotation of drum 56 to the left in a counterclockwise direction (FIG. 2) will cause the pot 14 to be moved from the position shown in FIGURE 2 to the position shown in FIGURE 1 for transportation back to an area where the pot is to be unloaded from the vehicle and where another pot, such as 14, can be lifted onto the vehicle for transportation to a dumping area.

In order to unload empty pot 14 from the vehicle, drum 56 is driven in a clockwise direction to move the pot from its position shown in FIGURE 1 to its position shown in FIGURE 2. Continued rotation of drum 56 thereafter will cause the pot 14 to move to the position shown in FIGURE 8 wherein pins 28 of frame 22 can move into the slots 29–38–29'. It is to be noted at this time that hydraulic units 81 are not energized, that is, pins 84 are kept in retracted position out of depressions 85. This will cause pot 14 to remain unlocked relative to arms 23 so that pins 40 may pivot relative to the ends 43 of slots 41. It is to be noted at this point that the empty pot 14 is still unbalanced relative to the pins 27 about which it pivots rearwardly and therefore in order to set the pot 14 down, it is merely necessary to rotate drum 44 in a clockwise direction to play out the upper run of cable 49. Thus, arms 23 will pivot in a clockwise direction about pins 27 because of the unbalance of pot 14 and this movement will continue until such time as pins 28 enter aligned slots 29–38–29'. Thereafter continued pivotal movement will continue about pins 28 after they have completely entered the slots associated therewith. However, it is to be noted that pot 14 will remain in an upright position by virtue of the fact that pins 40 thereof can pivot relative to the ends 43 of slots 41. As the arms 23 pivot from an upright position to the position shown in FIGURE 4, the vertical axis of pot 14 will remain vertical until pot 14 rests on the ground, and this occurs when the frame 22 reaches the position shown in FIGURE 4. It is to be noted that at the terminal portion of pivotal movement of frame 22, pin 40 will slide to the right in FIGURE 4 away from the end 43 of slot 41 so that continued movement in a clockwise direction of arms 23 will permit pins 40 to enter the open portion 42 associated with slots 41. The movement of arms 23 in a clockwise direction is continued until pins 40 are clear of the arms and thereafter the vehicle can be moved to the left in FIGURE 4 so that it can be moved away from the pot which not stands on the ground 39.

In order to lift another pot which is to be carried to a dumping area, the steps enumerated above are again repeated.

In FIGURE 14 an alternate arrangement is shown for locking the pot 14' to the lifting arm frame 22'. Pot 14' and frame 22' are identical in all respects to pot 14 and frame 22, respectively, except for the modifications noted hereafter. Frame 22' includes an upper lip 90 at the top of strut 55, which is adapted to rest against the upper lip 91 of pot 14' when the latter is in a vertical position. In addition, a hydraulic motor 92 consisting of a cylinder 93 and a piston 94 is mounted on strut 55. Suitable hydraulic leads and controls (not shown) are associated with motor 92. When it is desired to lock pot 14' relative to frame 22', it is merely necessary to cause piston 94 to move to the position shown in FIGURE 14 to underlie protuberance 95 attached to pot 14. This will lock pot 14' to frame 22' because, as can be seen, if pot 14' were to pivot in a clockwise direction, piston 94 would cause it to pivot in unison with frame 22'. However, when it is desired to set pot 14' down in an upright position, piston 94 is retracted out of engagement with lip 95 so that as frame 22' pivots in a clockwise direction, pot 14' may remain upright by virtue of the pivotal connection between its pins 40 and slots 41 in arms 23, such as shown in the other figures.

It is to be noted that the construction for moving the pot back and forth along the trailer may be identical to that shown in the above-mentioned Patent No. 3,266,648, and the subject matter thereof is incorporated herein by reference.

It can thus be seen that the instant pot trailer of the present invention is manifestly capable of achieving the above objects, namely, of modifying the existing pot trailer shown in the above noted Patent No. 3,266,648 so that it can be used by itself, without the services of an auxiliary crane, for lifting a pot of slag from the ground, transporting it to a dumping area, dumping it without unloading the pot from the trailer, transporting the empty pot back to an unloading area, and thereafter unloading the pot from the trailer.

Figure 21:
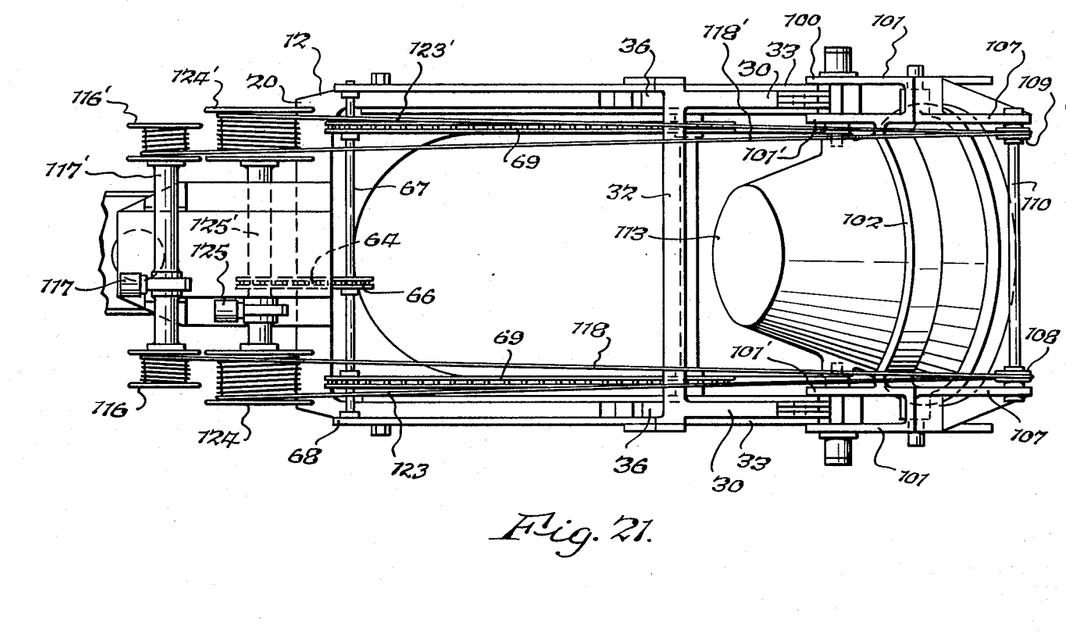
FIGURE 21 is a fragmentary plan view of the trailer showing the cable arrangement for moving and tilting the pot carrying frame.
Figures 22, 23:
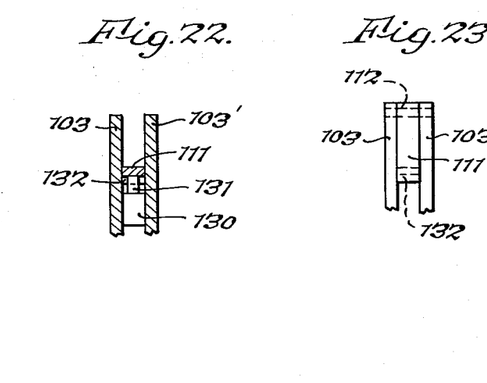
FIGURE 22 is a fragmentary view taken in the direction of arrows 22—22 of FIGURE 16 and showing the relationship between the arms and the locking motor for each hook, with certain parts being omitted in the interest of clarity.
FIGURE 23 is a view taken generally in the direction of arrows 23—23 of FIGURE 15 and showing the manner in which each hook is mounted on the upstanding arms of the lifting arm frame.

The embodiment of FIGURES 15 through 23 includes a lifting arm frame 100 having spaced parallel pairs of frame members 101, 101' connected at their forward ends to cross bar 102 (FIG. 21). Each of members 101' merge into upwardly extending arms 103' (FIG. 23) which are parallel to upwardly extending arms 103 which are formed at the ends of members 101. In other words, each side of frame 100 includes two members 101–103 and two members 101'–103', with each of the members being identical to the other and spaced from each other. Bridging the gap between each pair of members 101–101' are pins 104, 105 and 106 which are identical to pins 26, 27 and 28, respectively, of FIGURE 12 and which perform the same function. At this point it is to be noted that it is the lifting arm frame 100 and its cable drive which differ from lifting arm frame 22 and drives of the preceding figures, but that the remainder of the vehicle is identical except in certain details to be described hereafter. Therefore a detailed description of the vehicle will be omitted in the interest of brevity. At the front end of lifting arm frame 100 and extending upwardly therefrom at an angle are spaced arms 107 carrying at their upper ends spaced idler pulleys 108 and 109 (FIG. 21) which are rotatably mounted on shaft 110 extending between arms 107. Each of these pulleys is free to rotate independently of the other.

Figure 18:
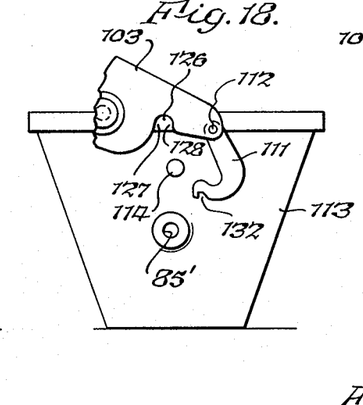
FIGURE 18 is a fragmentary view of the hook and the pot prior to engagement therebetween or after engagement has been terminated.
Figure 19:
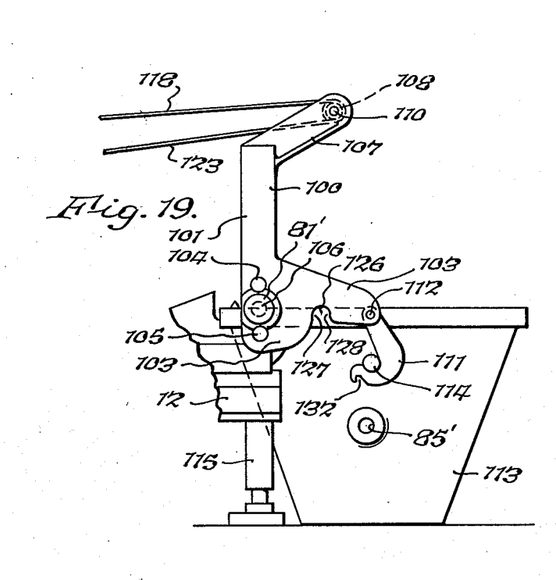
FIGURE 19 is a side elevational view showing the relationship between the hook and the pot when the pot is sitting on the ground and engagement is just beginning or terminating.
Figure 20:
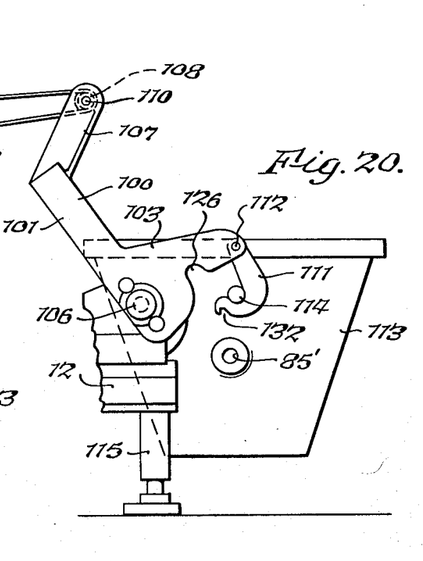
FIGURE 20 is a fragmentary side elevational view showing the pot in the process of being lifted onto the frame or being set down.

A hook 111 is pivotally mounted between each pair of arms 103–103' by pin 112 extending between said arms. Hook 111 is free to swing by its own weight so that it will always assume a vertical position such as shown in FIGURE 19 regardless of the position of the frame 100 on which it is mounted. In order to lift a pot 113 from the ground, the trailer 12 is backed up so the rear portion thereof is proximate pot 113. Thereafter the cable, to be described hereafter, around pulleys 108 and 109 is played out so that frame 100 will tilt rearwardly so that it occupies a position such as in FIG. 17, but without the pot mounted thereon. At this time each of hooks 111 will lie beyond pins 114 of pot 113, as shown in FIG. 18, it being noted that a pin 114 is located on each side of the pot with the pins being diametrically opposed to each other and lying on the centerline of the pot. Thereafter, the trailer is moved forward, to the left in FIGURE 18, and the frame 100 is pivoted in a counterclockwise direction from the position shown in FIGURE 18 to the position shown in FIGURE 19 until each of hooks 111 engage a pin 114. Thereafter, a hydraulic piston and cylinder motor 115 is energized on each side of the trailer to provide support for the trailer at the rear end thereof. Thereafter, the frame 100 is rotated in a counterclockwise direction from the position of FIGURE 19 to the position of FIGURE 20 and thence to the position of FIGURE 16 to lift pot 113 from the ground up onto the trailer. At this point it is to be noted again that pins 104, 105 and 106 on each side of frame 100 operate in the identical manner to pins 26, 27 and 28 of FIGURES 1 through 14 and therefore a detailed explanation of this mode of operation will not be repeated at this time.

Figure 15:
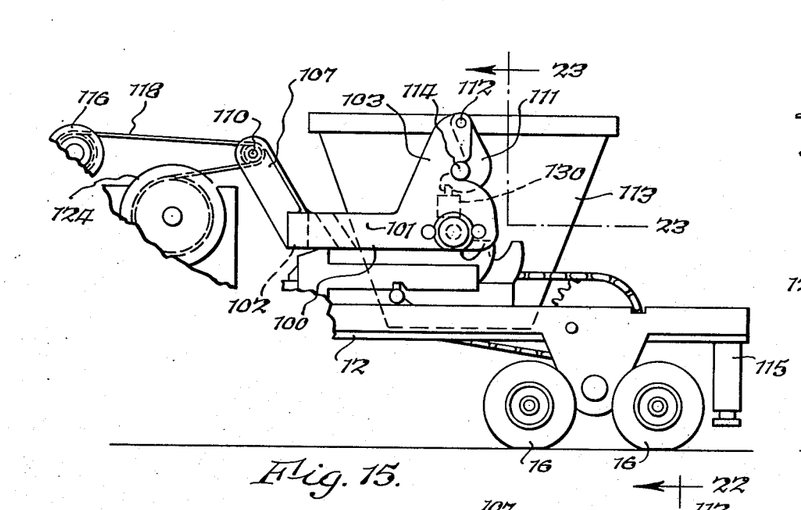
FIGURE 15 is a fragmentary side elevational view of another embodiment of the improved vehicle of the present invention showing the pot in the transit position.
Figure 16:
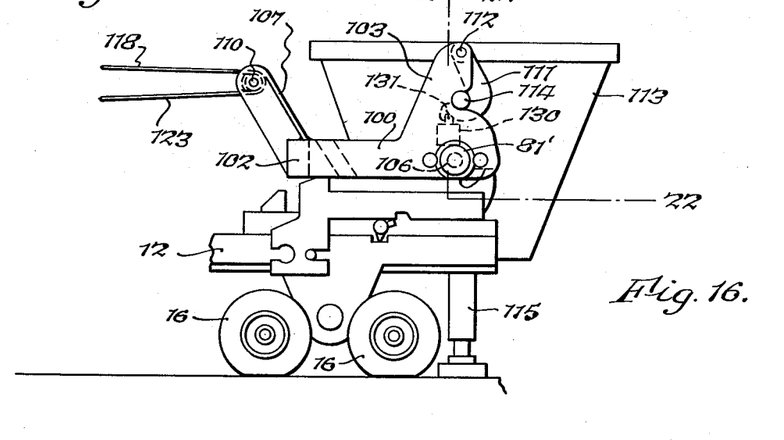
FIGURE 16 is a fragmentary side elevational view showing the pot in its rearmost position on the trailer.
Figure 17:
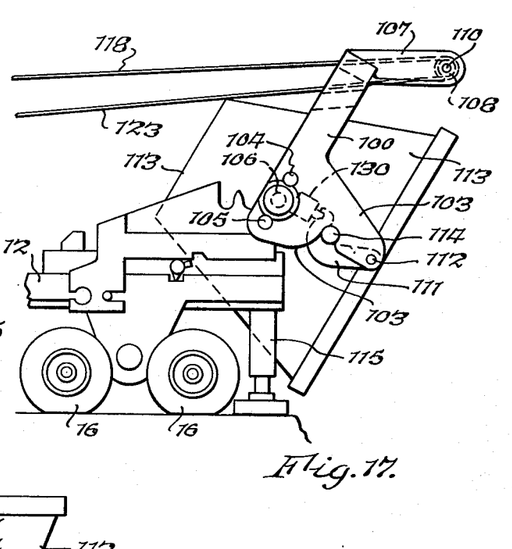
FIGURE 17 is a fragmentary side elevational view showing the pot and related linkage in dumping position.

In order to lift the pot 13 containing slag from the ground as shown in FIGURE 18 onto the rear of the vehicle as shown in FIGURE 16, a pulley and cable arrangement is utilized. More specifically, drums 116 and 116' are mounted on opposite ends of shaft 117' which is suitably journalled on the frame of the vehicle and driven by hydraulic motor 117. The upper runs 118 and 118' of the cables lead from drums 116 and 116', respectively, and extend around idler pulleys 108 and 109, respectively. Thereafter the cables continue with lower runs 123 and 123' and are wound on drums 124 and 124', respectively, mounted on the ends of shaft 125' which is suitably journalled on the vehicle and driven by hydraulic motor 125. It can readily be seen that as drums 116 and 116' are driven in a counterclockwise direction in FIGURE 15 while drums 124 and 124' are held stationary, lifting arm frame 100 will be caused to tilt in a counterclockwise direction about its pivot pins 104, 105 and 106 in moving consecutively from the position shown in FIGURE 19 to the positions shown in FIGURES 20 and 16.

After pot 113 has been moved to the position shown in FIGURE 16, it will be noted that pins 114 of pot 113 will enter slots 126 (FIG. 19) formed in arms 103–103'. The lower surfaces 127 on the portions of arms 103–103' proximate each slot 126 provide a rest for pins 114 when the pot is in the upright position. In addition, the sides 128 (FIG. 19) of each slot 126 prevents pin 114 from moving upwardly when pot 113 has been moved to the dumping position shown in FIGURE 17.

After rotation of drums 116 and 116' has been terminated with the arrival of the pot in the position shown in FIGURE 16, drums 124 and 124' are energized to rotate in a counterclockwise direction to reel in the lower runs of the cable and thus cause the carriage arrangement, which is identical to that disclosed above relative to FIGURES 1 to 14, to move to the left in FIGURE 16 until it reaches the position shown in FIGURE 15 wherein the pot is generally centrally located on the trailer in a position which it occupies in transit. Thereafter, the trailer is driven to a dumping area for dumping and in this area shaft 125' and drums 124 and 124' are rotated in a clockwise direction so that the chain drive associated therewith drives the carriage on which pot 113 is mounted from the position shown in FIGURE 15 to the position shown in FIGURE 16, as described in detail above relative to the embodiments of FIGURES 1 through 14. The cable will be played out from drums 124 and 124' as the pot moves toward the rear of the trailer in the manner described above.

It is to be noted that a locking arrangement which is identical to that shown in FIGURE 7 is provided for pinning pot 113 relative to each pair of arms 103–103'. Essentially this arrangement consists of a hydraulic motor 81' which is identical in all respects to that shown in FIGURE 7 and includes a piston 84 which is received in a suitable recess 85' in each side of pot 113, recess 85' being identical to that shown in FIGURE 7 relative to pot 14.

After the pot 113 has been locked to arms 103–103' by a motor 81' on each arm, the cable is played out by causing drums 116 and 116' to rotate in a clockwise direction in FIGURE 15. Pot 113 will pivot rearwardly from the position shown in FIGURE 16 to the position shown in FIGURE 17 by its own unbalance. In this respect the pin arrangement 104, 105, 106 and its supporting structure are identical to that shown in FIGURES 1 to 14 and this will permit the rearward tilting to be effected as described in detail above. Hooks 111 however will not be permitted to assume their vertical position during this rearward tilting because they are locked relative to arms 103–103' by a hydraulic motor 130 which is suitably mounted between each pair of arms 103–103' and the piston 131 acts as a tongue which is received in detent or groove 132 in hook 111 (FIG. 18). After dumping has been completed pot 113 is moved back to the position shown in FIGURE 16 by causing the upper run 118 of the cable to move to the left in FIGURE 17 by rotating drums 116 and 116' in a counterclockwise direction. Thereafter, the steps which were followed after pot 113 was mounted on the rear of the frame are followed to cause it to move back to its central transit position.

Thereafter the trailer is driven to an unloading site wherein pot 113 is moved from the position shown in FIGURE 15 to the position shown in FIGURE 16 by driving shaft 125' and drums 124 and 124' in a clockwise direction, which simultaneously plays out the lower runs 123 and 123' of the cable and also drives the chain which drives the carriage on the trailer. After pot 113 reaches its rearmost position motors 130 are energized to withdraw pistons 131 from locking engagement with hooks 111 so that as the frame 100 tilts in a clockwise direction by virtue of its own unbalance, as the cable is played out by the rotation of drums 116 and 116' in a clockwise direction, hooks 111 on each side of the pot may retain their vertical positions so as to cause pot 113 to tilt away from arms 103–103'. The hydraulic connections to motors 130 are not shown. It is to be noted that prior to tilting frame 100 rearwardly, locking motors 81' cause the pins to be withdrawn from recesses or depressions 85' in the pot to permit pot 113 to retain a vertical position throughout its backward movement. After the pot as touching the ground, as shown in FIGURE 19, the frame 100 is caused to continue its clockwise rotation until hooks 111 reach a position away from pins 114. Thereafter, the is backed up until hooks 111 are considerably to the right of pins 114, as shown in FIG. 18, and thereafter frame 100 is pivoted in a counterclockwise direction to raise the hooks 111 above pins 114 so that the trailer can be moved forward. Thereafter the trailer is backed up so that hooks 111 lie to the right of pins 114 of another pot and hooks 111 are lowered to the position shown in FIGURE 18 prior to moving the trailer to the left so that hooks 111 will move into the position shown in FIGURE 19 preparatory to pivoting frame 100 in a counterclockwise direction to raise the pot.

It can readily be seen that the embodiment of FIGURES 15 through 23 functions essentially like the embodiments of FIGURES 1 to 14 except that it has a different lifting arrangement utilizing a different frame, a different hook structure, and a different drum and cable arrangement. However, except for those elements of structure specifically described relative to FIGURES 15 to 23, it will be understood that all portions of the trailer and related equipment are identical to that described above in detail relative to FIGURES 1 to 14.

What is claimed is:

1. A slag pot carrying vehicle for carrying a massive load consisting of a slag pot and its contents of flowable slag comprising a frame having a front portion and a rear portion, rear wheels on said frame proximate said rear portion, a carriage, arm means constituting a unit separate from said pot for selective engagement and disengagement with said pot, mounting means pivotally mounting said arm means for pivotal movement about an axis extending in a direction transverse to the longitudinal axis of said frame for mounting and demounting said pot relative to said carriage, track means on said frame, means mounting said carriage for movement along said track means, motor means for driving said carriage between a first position and a second position on said track means, said first position being remote from said rear portion of said frame and being located to one side of said rear wheels between said front and rear portions of said frame, said second position being closer to said rear portion of said frame and substantially overlying said rear wheels, said slag pot and its contents exerting less of a load on said rear wheels when said carriage is in said first position than when said carriage is in said second position, and pivoting means coupled to said arm means for effecting pivotal movement of said arm means fore and aft relative to said rear portion of said frame when said carriage is in said second position.

2. A slag pot carrying vehicle as set forth in claim 1 including means for locking said pot relative to said arm means while said pot is mounted in an upright position on said carriage, whereby said pot will tilt rearwardly of said vehicle with said arm means to effect dumping of the contents of said pot beyond said rear wheels upon actuation of said pivoting means.

3. A slag pot carrying vehicle as set forth in claim 2 including means for mounting said arm means in an unbalanced manner on said carriage to thereby permit said arm means to pivot rearwardly when said pivoting means are actuated.

4. A slag pot carrying vehicle for carrying a massive load consisting of a slag pot and its contents of flowable slag comprising a frame having a front portion and a rear portion, rear wheels on said frame proximate said rear portion, a carriage, arm means, mounting means pivotally mounting said arm means for pivotal movement about an axis extending in a direction transverse to the longitudinal axis of said frame for mounting and demounting said pot relative to said frame, track means on said frame, means mounting said carriage for movement along said track means, motor means for driving said carriage between a first position and a second position on said track means, said first position being remote from said rear portion of said frame and being located to one side of said rear wheels between said front and rear portions of said frame, said second position being closer to said rear portion of said frame and substantially overlying said rear wheels, said slag pot and its contents exerting less of a load on said rear wheels when said carriage is in said first position than when said carriage is in said second position, pivoting means coupled to said arm means for effecting pivotal movement of said arm means fore and aft relative to said rear portion of said frame when said carriage is in said second position, said arm means comprising a pair of spaced arms mounted on said carriage, hook means on each of said arms for engaging opposite sides of said pot, and support means on said arms for pivotally supporting said pot so as to permit said pot to maintain an upright attitude regardless of the position of said arms for mounting and demounting said pot relative to said carriage.

5. A slag pot carrying vehicle as set forth in claim 4 including means for locking said pot relative to said arms while said pot is mounted in an upright position on said carriage, whereby said pot will tilt rearwardly of said vehicle with said arms to effect dumping of the contents of said pot beyond said rear wheels upon actuation of said pivoting means.

6. A slag pot carrying vehicle as set forth in claim 5 wherein said mounting means include means for mounting said arm means in an unbalanced manner on said carriage while said arm means are carrying said pot to thereby permit said arms to pivot rearwardly when said pivoting means are actuated.

7. A slag pot carrying vehicle as set forth in claim 4 wherein said frame comprises a pair of spaced tracks and wherein said carriage comprises a pair of spaced carriage members each mounted on a track, said carriage means including means joining said spaced carriage members together for movement in unison fore and aft on said spaced tracks, and wherein said arm means include frame means connecting said arms for movement in unison, and wherein said mounting means comprise pin means on said frame means proximate each of said arm means and journal means on said carriage members for receiving said pin means, and locking means for locking said arms against pivotal movement about said pin means relative to said carriage.

8. A slag pot carrying vehicle as set forth in claim 7 wherein said support means comprise bearing surfaces and wherein said bearing surfaces are located rearwardly in off-center relationship relative to the axis of pivotal movement of said pin means, whereby said arms and said pot carried thereby can move rearwardly by its own unbalance relative to said carriage when said locking means are released.

9. A slag pot carrying vehicle as set forth in claim 8 wherein said pivoting means comprises reel means for playing out to permit said arms to pivot and cause said pot to move rearwardly and for reeling in to cause said arms to pivot and cause said pot to move forwardly.

10. A slag pot carrying vehicle as set forth in claim 9 including means for locking said pot relative to said arms while said pot is mounted in an upright position on said carriage, whereby said pot will tilt rearwardly of said vehicle with said arms to effect dumping on the contents of said pot beyond said rear wheels upon actuation of said pivoting means.

11. A vehicle for carrying a slag pot having a center of gravity comprising a vehicle frame, arm means, hook means on said arm means for pivotally supporting said slag pot relative to said arm means, pivot means between said arm means and said frame located forwardly of said center of gravity of said pot for permitting said arm means to pivot rearwardly relative to said frame while supporting said pot in response to the unbalance created by said center of gravity of said pot relative to said pivot means, and actuating means for causing said arm means to pivot in a first direction about said pivot means in raising said pot from the ground onto said frame against the weight of said pot exerted by said center of gravity and for permitting said arm means to pivot in a second direction which is opposite to said first direction in response to said unbalance created by said center of gravity of said pot to lower said pot onto the ground.

12. A slag pot carrying vehicle comprising a vehicle frame, arm means, hook means on said arm means for supporting a slag pot, pivot means for permitting said arm means to pivot rearwardly while supporting said pot in response to the unbalance created by said pot, actuating means for causing said arm means to pivot in a first direction about said pivot means in raising said pot onto said vehicle and for permitting said arm means to pivot in a second direction which is opposite to said first direction in response to said unbalance created by said pot to lower said pot onto the ground, said arm means comprising a pair of spaced arms and said hook means comprising spaced hooks, and means pivotally mounting said spaced hooks on said arms to permit said spaced hooks to maintain an upright position while said arms are pivoting.

13. A slag pot carrying vehicle as set forth in claim 12 including means for locking said pot relative to said arms while said pot is mounted in an upright position on said vehicle, whereby said pot will tilt rearwardly with said arm means to effect dumping of the contents of said pot.

14. A slag pot carrying vehicle as set forth in claim 13 including means for locking said hooks relative to said arms.

15. A slag pot carrying vehicle as set forth in claim 11 wherein said arm means comprise a carrying arm frame which is pivotable as a unit with said arm means and on which said arm means form an integral part, pulley means mounted on said carrying arm frame for movement therewith, and wherein said actuating means comprises cable means having opposite end portions effectively affixed to said vehicle frame and a central portion encircling said pulley means, and drum means mounted on said vehicle frame for reeling said cable means to effect pivotal movement of said carrying arm frame.

16. A slag pot carrying vehicle as set forth in claim 15 wherein said pulley means comprise a pair of spaced pulleys, and wherein said drum means comprise a pair of spaced first drums, and first motor means for driving said first drums in opposite directions to reel said cable in and out for effecting pivoting of said arm means.

17. A slag pot carrying vehicle as set forth in claim 16 including a pair of spaced second drums, second motor means for driving said second drums in opposite directions, and wherein said cable means comprises a first cable extending around one of said pulleys and between one of said first drums and one of said second drums and a second cable extending around the other of said pulleys and between the other of said first drums and the other of said second drums.

18. A slag pot carrying vehicle comprising a vehicle frame, arm means, hook means on said arm means for supporting a slag pot, pivot means for permitting said arm means to pivot rearwardly while supporting said pot in response to the unbalance created by said pot, actuating means for causing said arm means to pivot in a first direction about said pivot means in raising said pot onto said vehicle and for permitting said arm means to pivot in a second direction which is opposite to said first direction in response to said unbalance created by said pot to lower said pot onto the ground, said arm means comprising a carrying arm frame on which said arm means are mounted, pulley means on said frame, said actuating means comprising cable means encircling said pulley means, drum means mounted on said vehicle frame for carrying said cable means, said pulley means comprising a pair of spaced pulleys, said drum means comprising a pair of spaced first drums, first motor means for driving said first drums in opposite directions to reel said cable in and out for effecting pivoting of said arm means, a pair of spaced second drums, second motor means for driving said second drums in opposite directions, said cable means comprising a first cable extending around one of said pulleys and between one of said first drums and one of said second drums and a second cable extending around the other of said pulleys and between the other of said first drums and the other of said second drums, carriage means for supporting said arm means, track means for supporting said carriage means, drive means for driving said carriage means back and forth on said track means, and said second motor means being coupled to both said second drums and to said drive means for effecting simultaneous movement of said second drums and said carriage.

19. A slag pot carrying vehicle for carrying a massive load consisting of a slag pot and its contents of flowable slag comprising a frame having a front portion and a rear portion, rear wheels on said frame proximate said rear portion, a carriage, arm means, mounting means pivotally mounting said arm means for pivotal movement about an axis extending in a direction transverse to the longitudinal axis of said frame for mounting and demounting said pot relative to said frame, track means on said frame, means mounting said carriage for movement along said track means, motor means for driving said carriage between a first position and a second position on said track means, said first position being remote from said rear portion of said frame and being located to one side of said rear wheels between said front and rear portions of said frame, said second position being closer to said rear portion of said frame and substantially overlying said rear wheels, said slag pot and its contents exerting less of a load on said rear wheels when said carriage is in said first position than when said carriage is in said second position, pivoting means coupled to said arm means for effecting pivotal movement of said arm means fore and aft relative to said rear portion of said frame when said carriage is in said second position, said arm means comprising a pair of spaced arms mounted on said carriage, hook means on each of said arms for engaging opposite sides of said pot, and means for pivotally mounting said hook means on each of said arms.

20. A slag pot carrying vehicle as set forth in claim 19 including means for locking said hook means relative to each of said arms.

21. A slag pot carrying vehicle as set forth in claim 20 including means for locking said pot relative to said arm means while said pot is mounted in an upright position on said carriage, whereby said pot will tilt rearwardly of said vehicle with said arm means to effect dumping of the contents of said pot beyond said rear wheels upon actuation of said pivoting means.

References Cited
UNITED STATES PATENTS

| | | | |
|---|---|---|---|
| 3,266,648 | 8/1966 | Hackett et al. | 214—300 |
| 3,330,429 | 7/1967 | Kress | 214—314 |
| 3,335,885 | 8/1967 | Livingston | 214—314 |

HUGO O. SCHULZ, Primary Examiner

U.S. Cl. X.R.

298—5

PO-1050
(5/69)

UNITED STATES PATENT OFFICE
CERTIFICATE OF CORRECTION

Patent No. 3,499,561   Dated   March 10, 1970

Inventor(s)   Walter C. Beckwith

It is certified that error appears in the above-identified patent and that said Letters Patent are hereby corrected as shown below:

Column 5, line 68, after "of" cancel --the--.

Column 8, line 6, change "a piston 83 is located in each cylinder" to read --24'. Pot 14 includes depressions or--.

Column 9, line 22, change "not" to --now--.

Column 12, line 4, after "the" insert --trailer--.

Column 13, (claim 10) line 65, change "on" to --of--.

SIGNED AND
SEALED
JUL 28 1970

(SEAL)
Attest:

Edward M. Fletcher, Jr.
Attesting Officer

WILLIAM E. SCHUYLER, JR.
Commissioner of Patents